(12) United States Patent
Wicks et al.

(10) Patent No.: US 11,530,070 B2
(45) Date of Patent: Dec. 20, 2022

(54) PAPER CUP AND METHOD OF FORMING THE SAME

(71) Applicant: LAVAZZA PROFESSIONAL NORTH AMERICA LLC, West Chester, PA (US)

(72) Inventors: David Wicks, Hampshire (GB); Tony McCoy, Devon (GB); Darren Nicholls, Hampshire (GB); John Warhurst, Berkshire (GB)

(73) Assignee: Lavazza Professional North America LLC, West Chester, PA (US)

( * ) Notice: Subject to any disclaimer, the term of this patent is extended or adjusted under 35 U.S.C. 154(b) by 0 days.

(21) Appl. No.: 17/075,334

(22) Filed: Oct. 20, 2020

(65) Prior Publication Data

US 2021/0114762 A1 Apr. 22, 2021

Related U.S. Application Data

(60) Provisional application No. 62/923,853, filed on Oct. 21, 2019.

(51) Int. Cl.
*B65D 3/06* (2006.01)
*B65D 3/14* (2006.01)
(Continued)

(52) U.S. Cl.
CPC .......... *B65D 3/06* (2013.01); *B65D 3/14* (2013.01); *B65D 21/0233* (2013.01); *B32B 2307/304* (2013.01); *B65D 3/04* (2013.01)

(58) Field of Classification Search
CPC ...... B65D 3/06; B65D 1/265; B65D 21/0233; B65D 21/02; B65D 3/30; B65D 1/42;
(Continued)

(56) References Cited

U.S. PATENT DOCUMENTS

| 1,776,358 A | 9/1930 | Huff |
| 1,864,836 A | 6/1932 | Lackner |

(Continued)

FOREIGN PATENT DOCUMENTS

| GB | 427364 | 4/1935 |
| JP | H02307738 A | 12/1990 |

(Continued)

OTHER PUBLICATIONS

European Search Report for related application EP 20202178.1 dated Mar. 17, 2021.

*Primary Examiner* — Don M Anderson
*Assistant Examiner* — Jennifer Castriotta
(74) *Attorney, Agent, or Firm* — The Belles Group PC

(57) ABSTRACT

A paper cup and a method of forming the same. The paper cup may include a sidewall and a floor portion that collectively define a cavity. In one aspect, the paper cup may include a rim that is coated with a rigid shell that encapsulates the rim. In another aspect, a void defined by a rim of the paper cup may be filled with a rigid filler material, and the rigid filler material may be one that expands upon application of heat thereto. In yet another aspect, the paper cup may include a separate rim component that is attached to the sidewall. The separate rim component may be formed from molded pulp fibers, and it may include a flange portion that is attached to the sidewall and a rim portion that protrudes from the sidewall.

15 Claims, 13 Drawing Sheets

(51) Int. Cl.
*B65D 21/02* (2006.01)
*B65D 3/04* (2006.01)

(58) Field of Classification Search
CPC ...... B65D 1/46; B65D 57/002; B65D 57/003; A47G 19/2216; A47G 23/0208; A47G 23/0216
USPC .......................................................... 220/716
See application file for complete search history.

(56) References Cited

U.S. PATENT DOCUMENTS

| | | | |
|---|---|---|---|
| 1,992,144 A | | 2/1935 | Conti |
| 1,995,698 A | * | 3/1935 | Wilson ................. B65D 3/12 229/5.7 |
| 2,071,662 A | * | 2/1937 | Smith ................. B65D 43/0222 229/5.5 |
| 2,142,744 A | * | 1/1939 | Carew ................. B65D 3/30 229/5.5 |
| 3,973,693 A | | 8/1976 | Brocklehurst |
| 4,344,814 A | | 8/1982 | McLaren |
| 5,145,107 A | | 9/1992 | Silver et al. |
| 5,226,586 A | * | 7/1993 | Grone ................. B65D 1/265 229/400 |
| 5,964,400 A | | 10/1999 | Varano et al. |
| 6,170,144 B1 | * | 1/2001 | Phillipson ............. A01G 9/021 29/453 |
| 8,852,493 B2 | | 10/2014 | Rasanen et al. |
| 9,327,895 B2 | | 5/2016 | Robertson et al. |
| 9,758,292 B2 | | 9/2017 | Leser et al. |
| 9,783,359 B2 | | 10/2017 | D'Amato |
| 10,415,188 B1 | | 9/2019 | Knauf |
| 10,493,735 B2 | | 12/2019 | Ding |
| 2002/0172818 A1 | | 11/2002 | DeBraal et al. |
| 2007/0084573 A1 | | 4/2007 | Bunker |
| 2009/0218390 A1 | | 9/2009 | Chang |
| 2009/0220711 A1 | | 9/2009 | Chang |
| 2010/0108695 A1 | | 5/2010 | Zhang et al. |
| 2010/0301047 A1 | * | 12/2010 | Garasi ................. A47G 19/2216 220/270 |
| 2013/0256394 A1 | | 10/2013 | Moutty |
| 2014/0246351 A1 | * | 9/2014 | Kobayashi ......... B65D 51/1622 206/524.6 |
| 2016/0046436 A1 | | 2/2016 | Haddad |
| 2018/0086505 A1 | | 3/2018 | DePena |
| 2018/0194520 A1 | * | 7/2018 | Lovern ................. A01N 25/34 |
| 2021/0387427 A1 | * | 12/2021 | Muller ................. B31B 50/003 |

FOREIGN PATENT DOCUMENTS

| | | |
|---|---|---|
| JP | 4676656 B2 | 2/2003 |
| KR | 2017/0074414 A | 6/2017 |
| WO | WO 2012/174422 A2 | 12/2012 |

\* cited by examiner

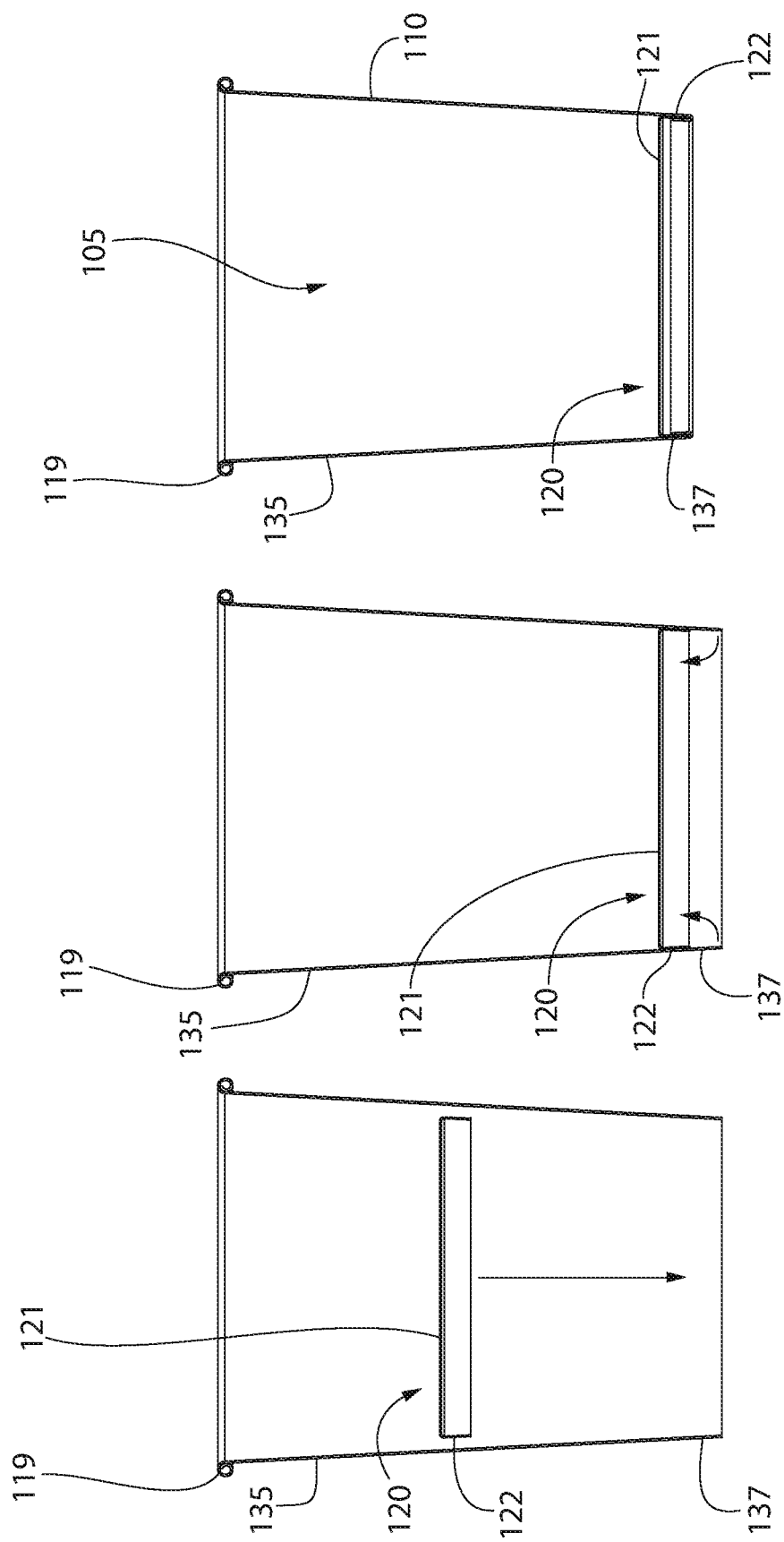

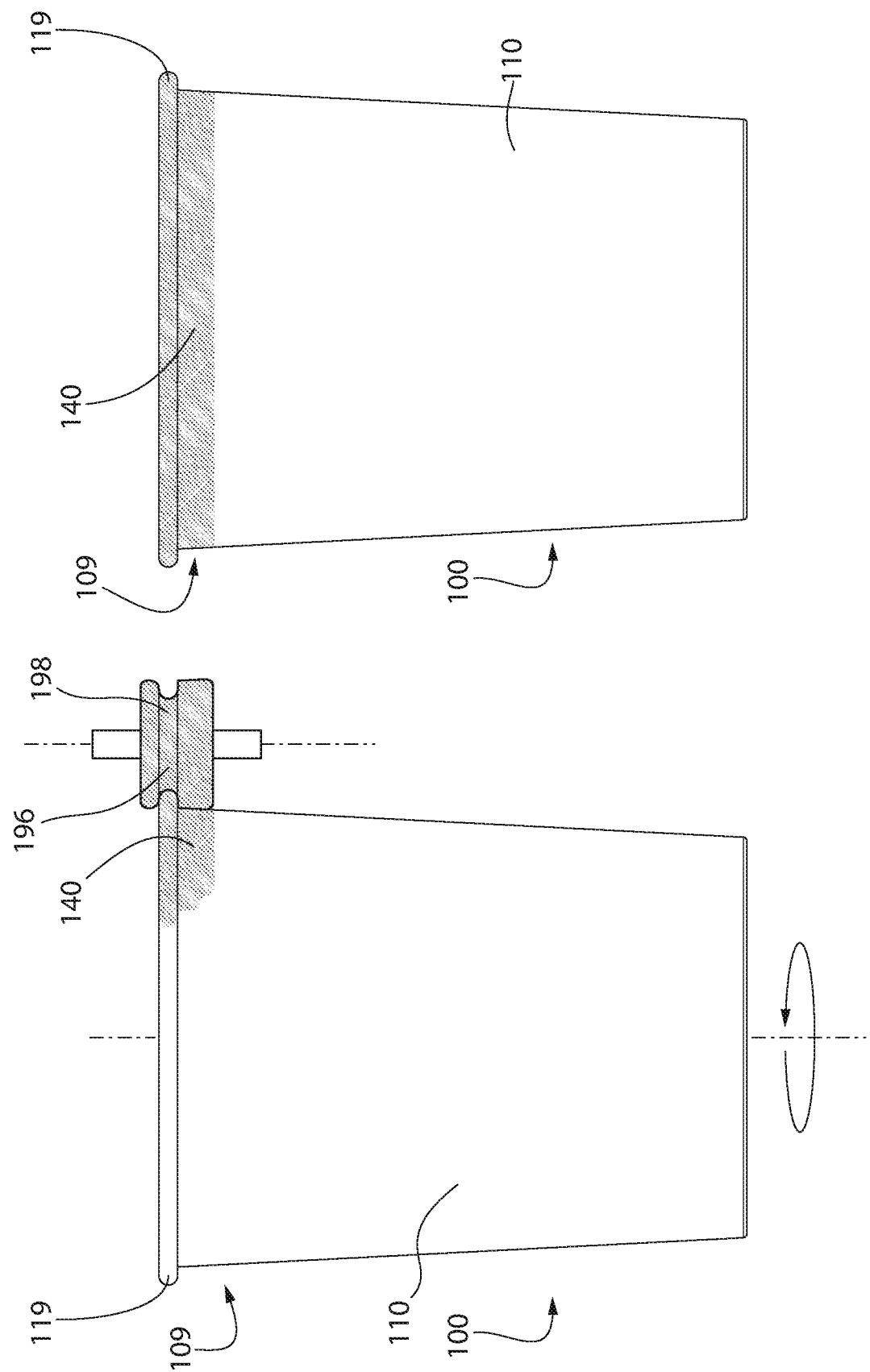

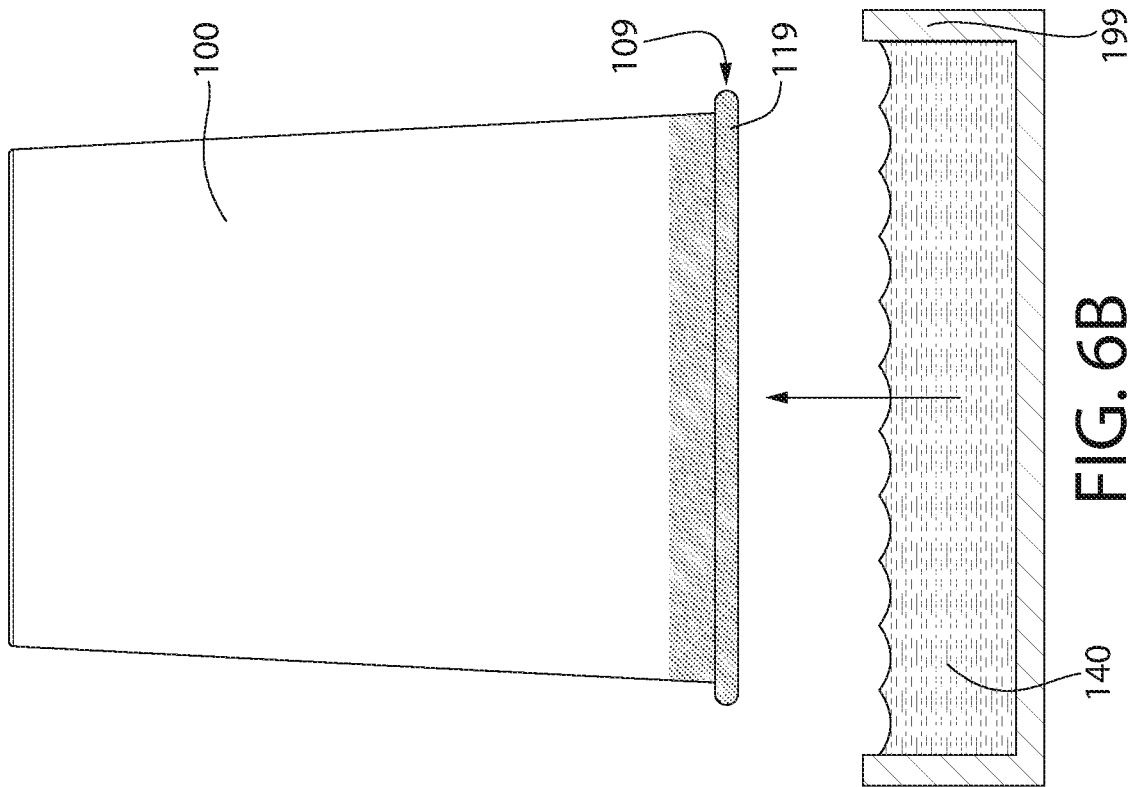
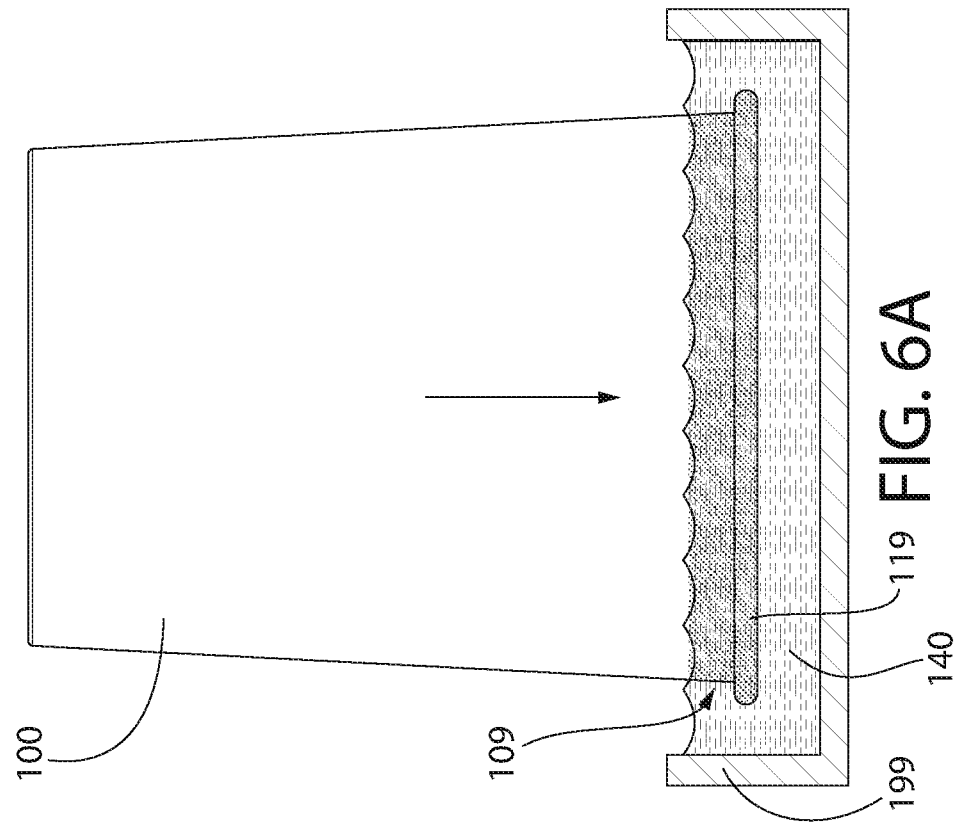

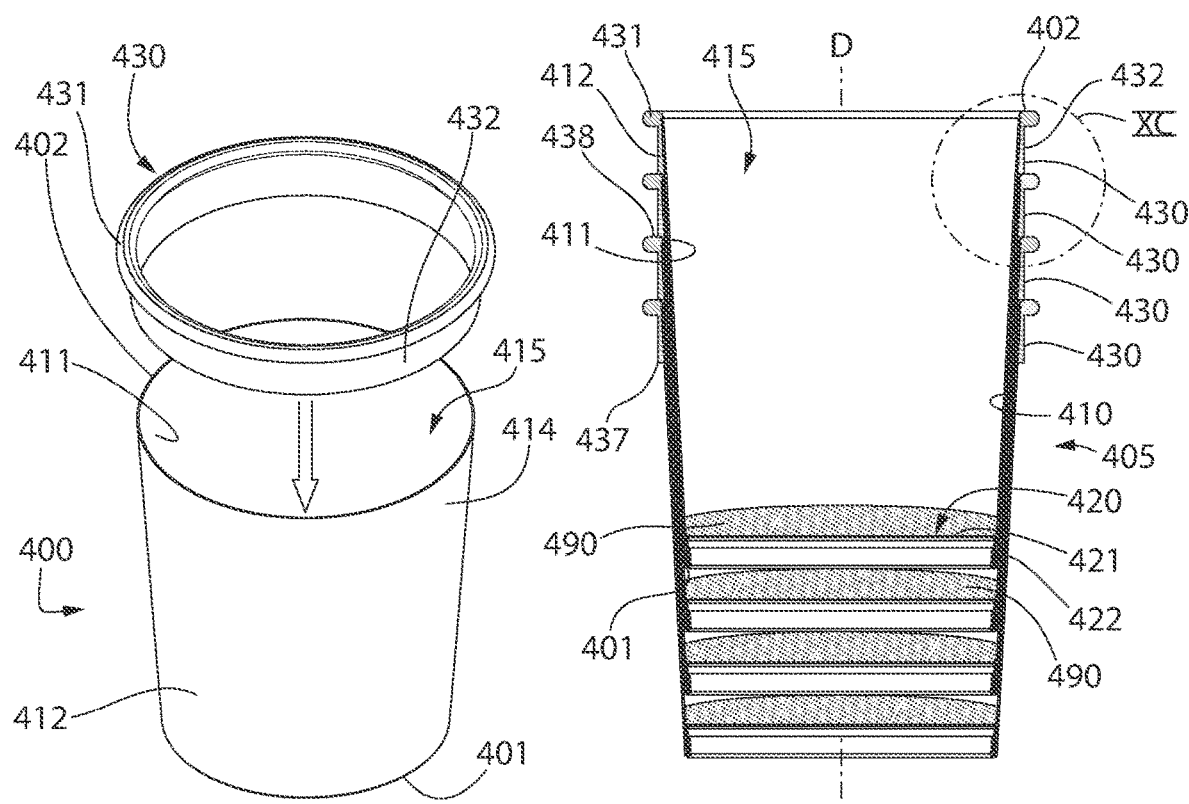
FIG. 10A
FIG. 10B
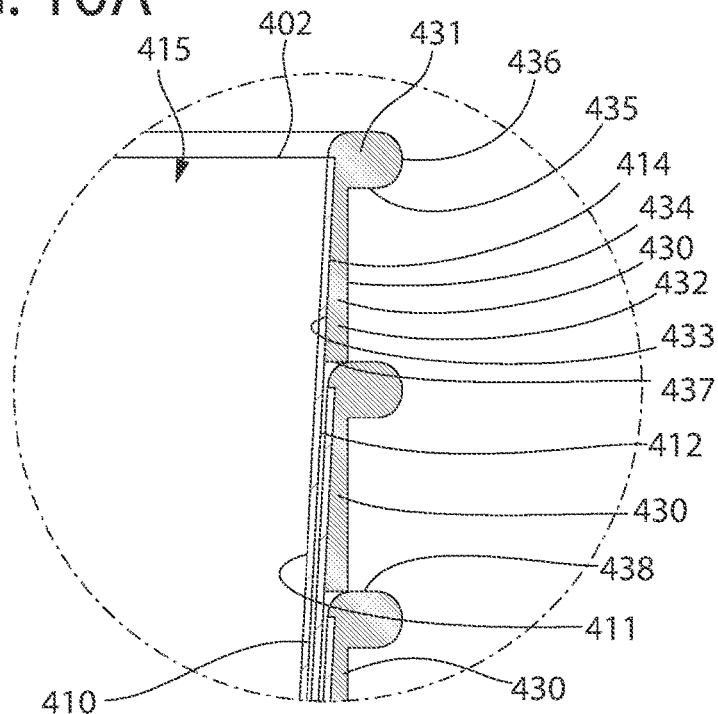
FIG. 10C

PAPER CUP AND METHOD OF FORMING THE SAME

CROSS-REFERENCE TO RELATED APPLICATIONS

The present application claims priority to U.S. Provisional Patent Application Ser. No. 62/923,853, filed Oct. 21, 2019, the entirety of which is incorporated herein by reference.

BACKGROUND OF THE INVENTION

Beverage vending machines create a beverage in a disposable cup and then present the disposable cup with the beverage therein to a consumer. Such beverage vending machines typically use cups that are pre-filled with powdered ingredients and inject a liquid such as water into the cups to form the desired beverage as the liquid mixes with the powdered ingredient. Both paper and plastic cups have their own environmental challenges and can be recycled. The introduction of paper cups enables users to make a choice based on local recycling schemes. One issue that occurs when using paper cups in beverage vending machines is that the mechanism that dispenses the cups rolls over and flattens the cup rim, rather than pushing downwardly on the rim and splitting the lowermost cup from the stack. Thus, a need exists for a paper cup with improved rim strength to reduce failures in dispensing of paper cups in beverage vending machines.

SUMMARY OF THE INVENTION

The present invention is directed to a paper cup and a method of forming the same. The paper cup may include a sidewall and a floor portion that collectively define a cavity. In one aspect, the paper cup may include a rim that is coated with a rigid shell that encapsulates the rim. In another aspect, a void defined by a rim of the paper cup may be filled with a rigid filler material, and the rigid filler material may be one that expands upon application of heat thereto. In yet another aspect, the paper cup may include a separate rim component that is attached to the sidewall. The separate rim component may be formed from molded pulp fibers, and it may include a flange portion that is attached to the sidewall and a rim portion that protrudes from the sidewall. The paper cups may be configured to be pre-filled with a powder beverage ingredient, stacked, and then used in a beverage vending machine.

In one aspect, the invention may be a paper cup comprising: a sidewall comprising a rim, an inner surface, and an outer surface; a floor portion; a cavity defined by the inner surface of the sidewall and the floor portion; and a coating covering a portion of the sidewall, the coating forming a rigid shell that encapsulates the rim, and wherein at least a lower half of the sidewall remains uncovered by the coating.

In another aspect, the invention may be a method of forming a paper cup comprising: manipulating a cup blank into a cylindrical or conical shape to form a sidewall of a cup; curling a top end of the sidewall to form a rim of the cup; attaching a floor member to the sidewall so that the sidewall and the floor member collectively define a cavity; and applying a coating onto the rim of the cup, the coating hardening to form a shell that encapsulates at least a rim of the cup, and wherein a lower portion of the sidewall remains free of the coating.

In another aspect, the invention may be a method of forming a paper cup comprising: forming a cup from a paper material, the cup comprising a sidewall and a rim; and applying a coating material onto the rim of the cup, the coating material hardening to form a shell that encapsulates at least the rim of the cup, and wherein a lower portion of the sidewall remains free of the coating material.

In yet another aspect, the invention may be a method of forming a cup comprising: applying a filler material onto a surface of a cup blank adjacent to a top edge of the cup blank; manipulating the cup blank into a cylindrical or conical shape to form a sidewall of a cup, the surface of the cup blank forming an outer surface of the sidewall of the cup; curling a top portion of the sidewall that comprises the top edge of the cup blank to form a rim of the cup, the filler material being located within a void defined by the rim; and attaching a floor member to the sidewall so that the sidewall and the floor member collectively define a cavity of the cup.

In a further aspect, the invention may be a paper cup comprising: a sidewall; a floor portion; a cavity having a cavity axis defined by the sidewall and the floor portion; a rim component comprising a rim portion and a flange portion, the flange portion being coupled to a top portion of the sidewall and the rim portion protruding radially outward from an outer surface of the sidewall; and wherein the sidewall, the floor portion, and the rim component are all formed from one or more paper-based materials.

In a still further aspect, the invention may be a method of forming a cup comprising: forming a cup body from a paper material, the cup body comprising a sidewall; molding a rim component from paper pulp fibers; and attaching the rim component to a top portion of the sidewall, a rim portion of the rim component protruding from an outer surface of the sidewall at a top end of the sidewall.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 3A-3F sequentially illustrate a method of manufacturing the paper cup of FIG. 1;

FIGS. 5A and 5B illustrate a method of coating a rim portion of the paper cup of FIG. 1 in accordance with a second embodiment of the present invention;

FIGS. 6A and 6B illustrate a method of coating a rim portion of the paper cup of FIG. 1 in accordance with a third embodiment of the present invention;

FIG. 10A is an exploded perspective view of a paper cup including a sidewall and a separate rim component, with an arrow indicating that the rim component can be moved towards the sidewall for coupling the rim component to the sidewall;

FIG. 10B is a cross-sectional view illustrating a stack of the paper cups of FIG. 10A with the rim component coupled to the sidewall;

FIG. 10C is a close-up view of area XC of FIG. 10B;

DETAILED DESCRIPTION OF THE INVENTION

Figure 1:
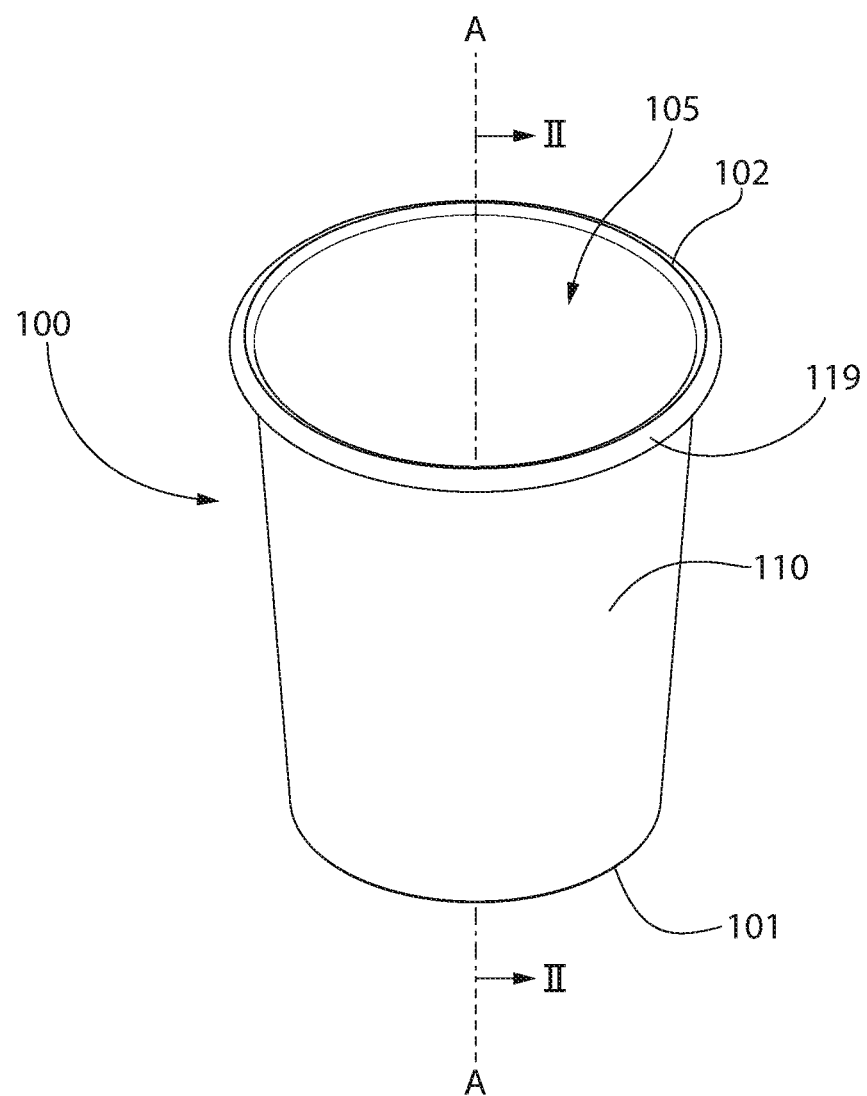
FIG. 1 is a perspective view of a paper cup in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
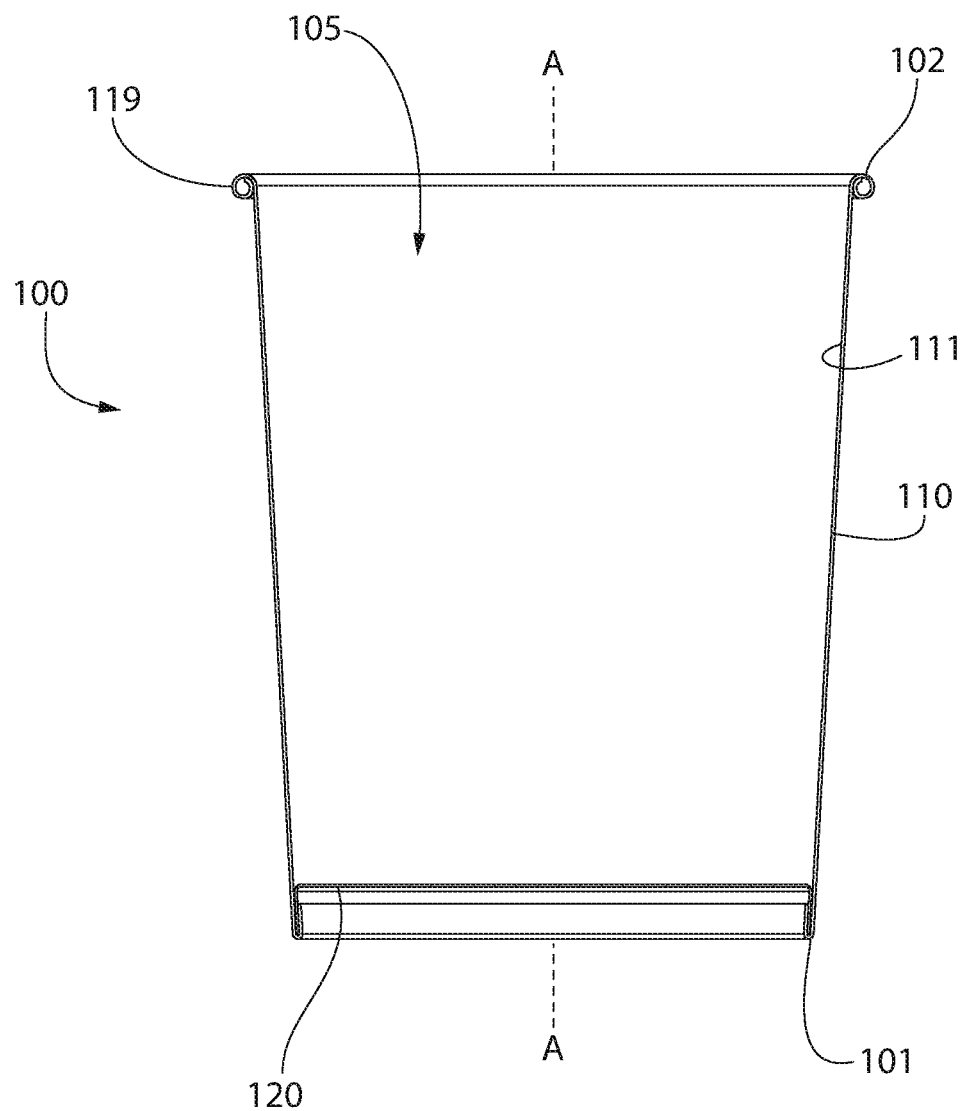
FIG. 2 is a cross-sectional view taken along line II-II of FIG. 1.

Referring to FIGS. 1 and 2, a paper cup 100 is illustrated in accordance with an embodiment of the present invention. The paper cup 100 is formed from paper-based materials and is devoid of any polyethylene. Moreover, the paper cup 100 does not have any plastic liners on its inner or outer surfaces which are used in conventional paper cups to provide a barrier to liquids, maintain the cup's structural integrity, and retain heat. This is because paper cups with such plastic barrier layers are not generally recyclable because the plastic liners cannot be readily separated from the paper material, which is required for adequate recyclability of the paper cups.

Because the paper cup 100 does not include any layers or liners formed from plastic, the paper cup 100 is able to be recycled as normal paper waste. As used herein, the term paper-based material includes all types of paper material including posterboard, cardboard, printing papers, or the like including materials formed from cellulose fibers derived from wood, rags, grasses, or other vegetable sources. Paper-based material, as used herein, also includes chemical pulp, wood-free paper, tree-free paper, wood fiber or wood pulp, flax, hemp, and cotton. In some embodiments, cups formed from paper-based materials are cups formed from cellulose fibers, which are fibers made with ethers or esters of cellulose which can be obtained from the bark, wood, or leaves of plants, or other plant-based materials. Cellulose fibers are the most basic and important constituent of paper.

Because the paper cup 100 does not include a polyethylene or other plastic liner, the paper cup 100 may include a water-based dispersion barrier which is free of plastic, or which includes plastic and/or other polymers in a percentage that is sufficiently small that it does not interfere with the paper waste recycling process. In some embodiments, the barrier coating may include a polymeric material, but not as a distinct layer. As a result, when the paper cup 100 goes to a recycling location, the agitation with water that is part of separating the fibers also breaks down the barrier so it is not an impediment to recyclability. Even if not explicitly mentioned, each of the cups described in this application may be formed from a paper-based material as defined herein so that the entirety of the cup can be recycled as paper waste.

FIGS. 1 and 2 depict a generally conventional paper cup 100. Specifically, the paper cup 100 comprises a sidewall 110 and a floor member 120 that collectively define a cavity 105 that extends along a cavity axis A-A. The sidewall 110 extends from a bottom end 101 to a top end 102 in a direction of the cavity axis A-A. A top portion of the sidewall 110 is rolled or curled to form a rim 119 of the paper cup 100. Curling or rolling the top portion of the sidewall 110 to form the rim 119 provides structural integrity to the paper cup 100 so that the top end of the paper cup 100 does not readily deform during normal handling and/or use thereof.

A bottom portion of the sidewall 110 is curled and bent inwardly and upwardly into an upward-facing U shape. The floor member 120 comprises a floor portion 121 and an annular flange portion 122. The floor member 120 is inserted through the opening in the top end 102 of the sidewall 110 until the annular flange portion 122 is disposed between the two sections of the bottom portion of the sidewall 110 which define the aforementioned U shape. Then, the annular flange portion 122 of the floor member 120 is bonded to the sidewall 110 via adhesive, ultrasonic welding, or other techniques as desired. As noted above, the floor portion 121 of the floor member 120 and an inner surface 111 of the sidewall 110 then define the cavity 105, which has an open top end at the top end 102 of the sidewall 110. The cavity 105 of the paper cup 100 can be filled with a liquid such as a beverage, soup, or the like as may be desired. In some instances, the paper cup 100 may be used in a beverage vending machine. In such instances, the cavity 105 of the paper cup 100 may be pre-filled with a powder beverage and then a plurality of the paper cups 100 may be arranged in a stack which is positioned inside of the beverage vending machine.

Figure 3A:
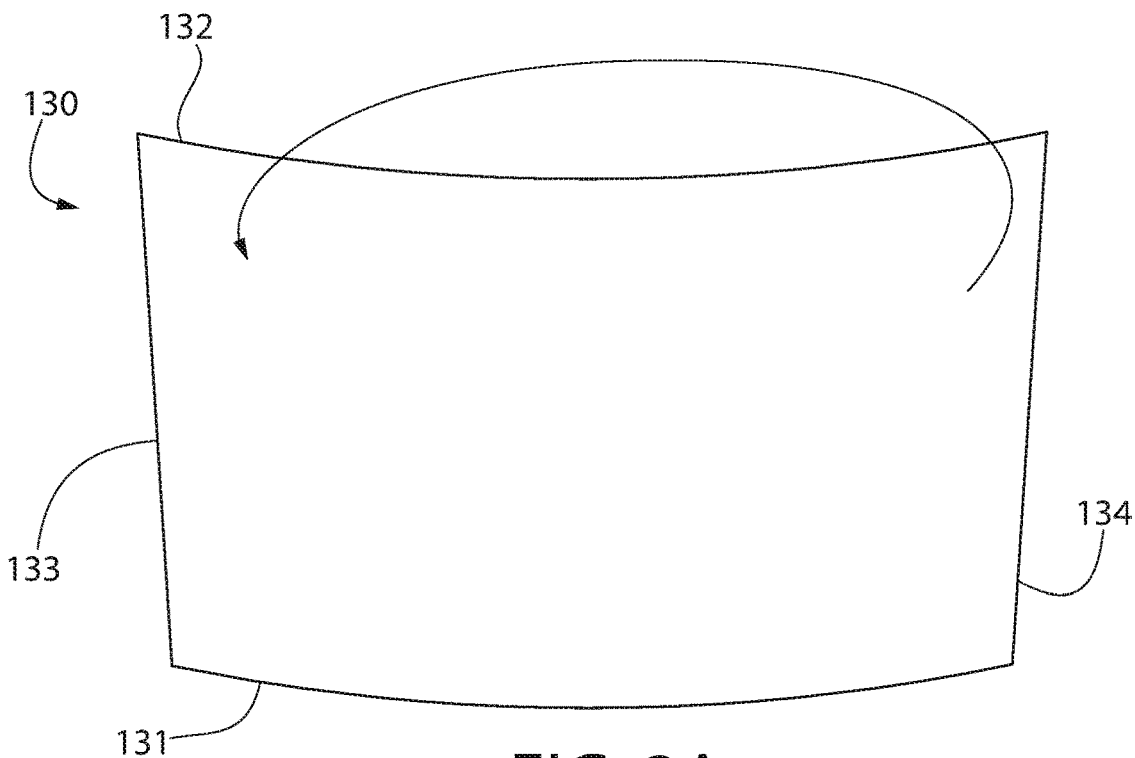
Figure 3B:
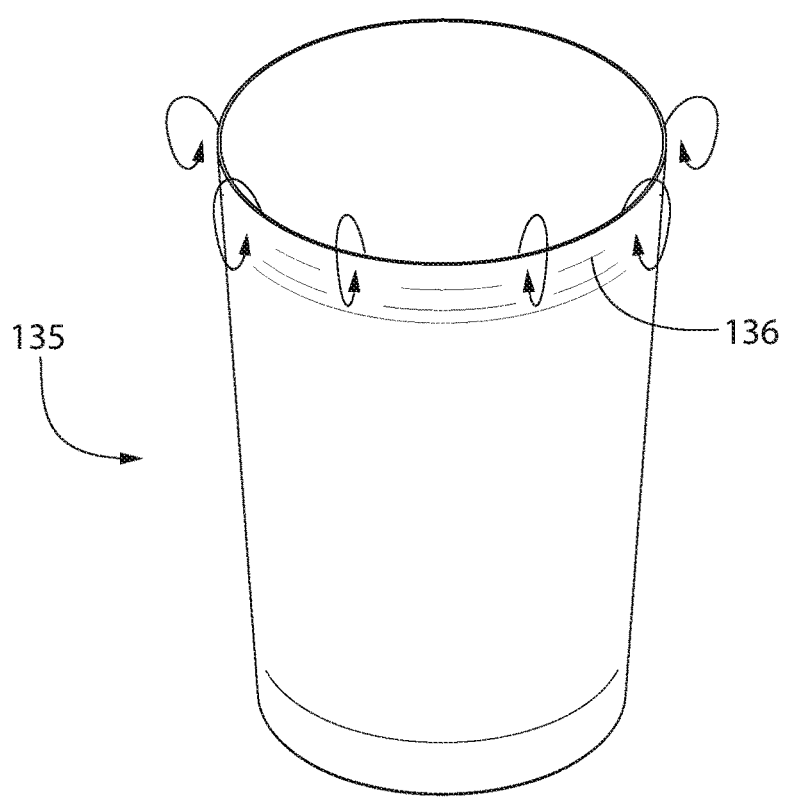

Referring to FIGS. 3A-3F, the method of manufacturing the paper cup 100 depicted in FIGS. 1 and 2 will be described. First, as shown in FIG. 3A, a cup blank 130 is provided. The cup blank 130 has a bottom edge 131, a top edge 132, a first side edge 133, and a second side edge 134. As depicted by the arrow in FIG. 3A, the cup blank 130 is manipulated or rolled so that the first and second side edges 133, 134 are aligned with one another, and more specifically so that one of the first and second edges 133, 134 slightly overlaps the other. Next, the cup blank 130 is bonded to itself using adhesives, ultrasonic welding, or the like, to form a sidewall portion 135 of the paper cup 100 as shown in FIG. 3B. The sidewall portion 135 of the paper cup 100 formed by the cup blank 130 has a cylindrical or conical shape.

Figure 3C:
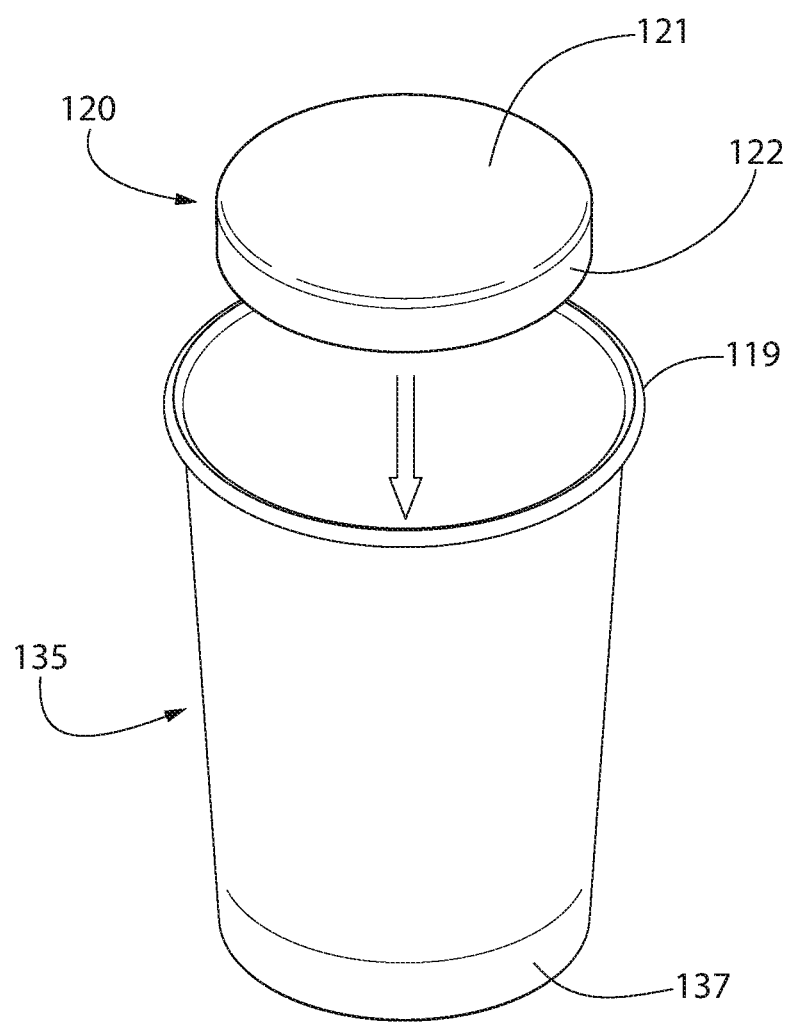

Next, as shown with the arrows in FIG. 3B, a top portion 136 of the sidewall portion 135 of the paper cup 100 is curled or rolled outwardly, to form the rim 119 of the paper cup 100 as shown in FIG. 3C.

Next, referring to FIGS. 3C-3F, the floor member 120 is inserted through the open top end of the sidewall portion 135 until it is positioned near a bottom end of the sidewall portion 135. Next, as shown in FIGS. 3E and 3F, a bottom portion 137 of the sidewall portion 135 is folded upwardly around the annular flange portion 122 of the floor member 120. The bottom portion 137 of the sidewall portion 135 can be bonded to the annular flange portion 122 of the floor member 120 using adhesives or ultrasonic welding as noted herein. Although in the exemplified embodiment the floor member 120 is positioned near a bottom of the sidewall portion 135 and then the bottom portion 137 of the sidewall portion 135 is folded upwardly around the annular flange portion 122 of the floor member 120, in other embodiments the bottom portion 137 of the sidewall portion 135 may be folded upwardly first and then the annular flange portion 122 inserted into the space between the folded bottom portion 137 of the sidewall portion 135. Once the floor member 120 is bonded or coupled to the sidewall portion 135, the sidewall portion 135 forms the sidewall 110 of the paper cup 100 and the sidewall 110 and the floor portion 121 collectively define the cavity 105. The cup blank 130 which forms the sidewall 110 and the floor member 120 are both preferably formed from a paper-based material, although they can be formed from the same paper-based material or different paper-based materials in various different embodiments.

In the exemplified embodiment, the paper cups described herein are of the type that include a sidewall formed from a cup blank and then a floor member which is separate from the sidewall and attached thereto. However, it should be appreciated that the invention is not to be so limited in all embodiments. Specifically, the paper cups that form part of this invention may include integral sidewall and floor components in some embodiments. For example, the paper cups could be formed by molding (dry pulp molding, wet pulp molding, or the like) so that the paper cup is an integral body that includes the sidewall and the floor. Raw materials used for molded pulp products of this type include without limitation sugarcane bagasse, wheat straw, woodchip, bamboo, recycled paper, or the like. The invention set forth herein may be applied to any paper cup made from any manufacturing process.

Referring to FIGS. 4A-6B, in accordance with an embodiment of the invention described herein, a portion 109 of the paper cup 100 may be coated with a coating material 140.

The details of the portion 109 of the paper cup 100 and what exactly that entails will be described in greater detail below with specific reference to FIGS. 4B and 7. However, before describing what portion of the paper cup 100 is coated with the coating material 140, it is noted that the coating material 140 may be applied onto the paper cup 100 using several different techniques, and the techniques described herein are not the only techniques that may be used.

Figure 4B:
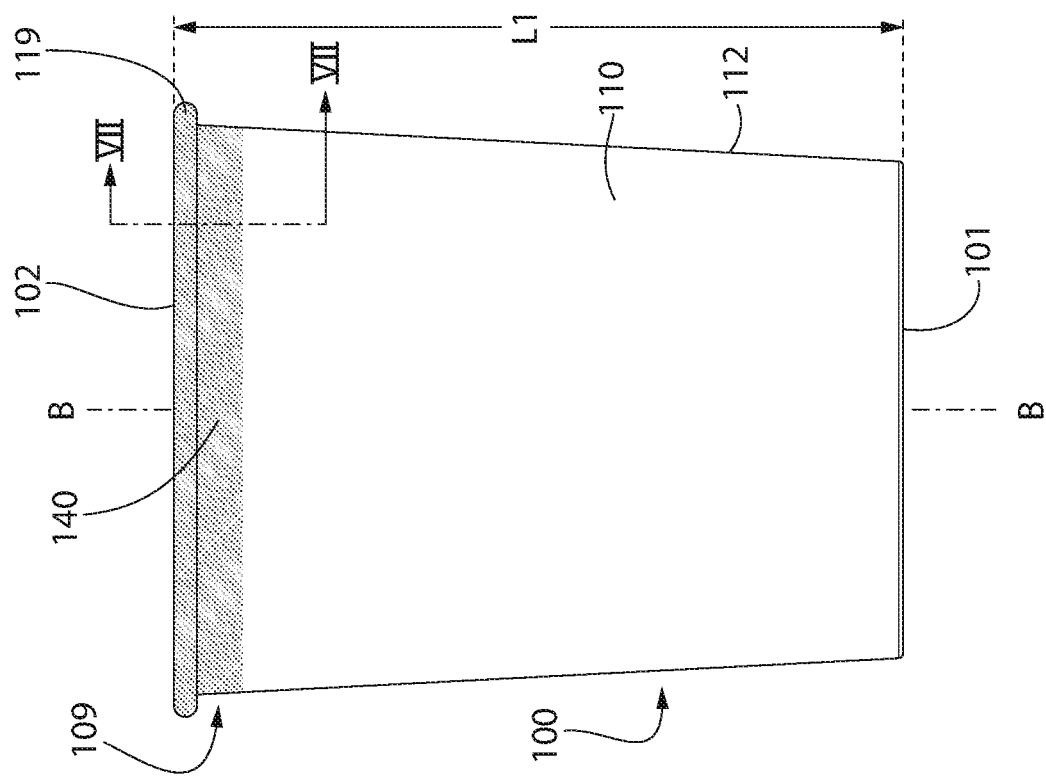
FIGS. 4A and 4B illustrate a method of coating a rim portion of the paper cup of FIG. 1 in accordance with a first embodiment of the present invention.
Figure 4A:
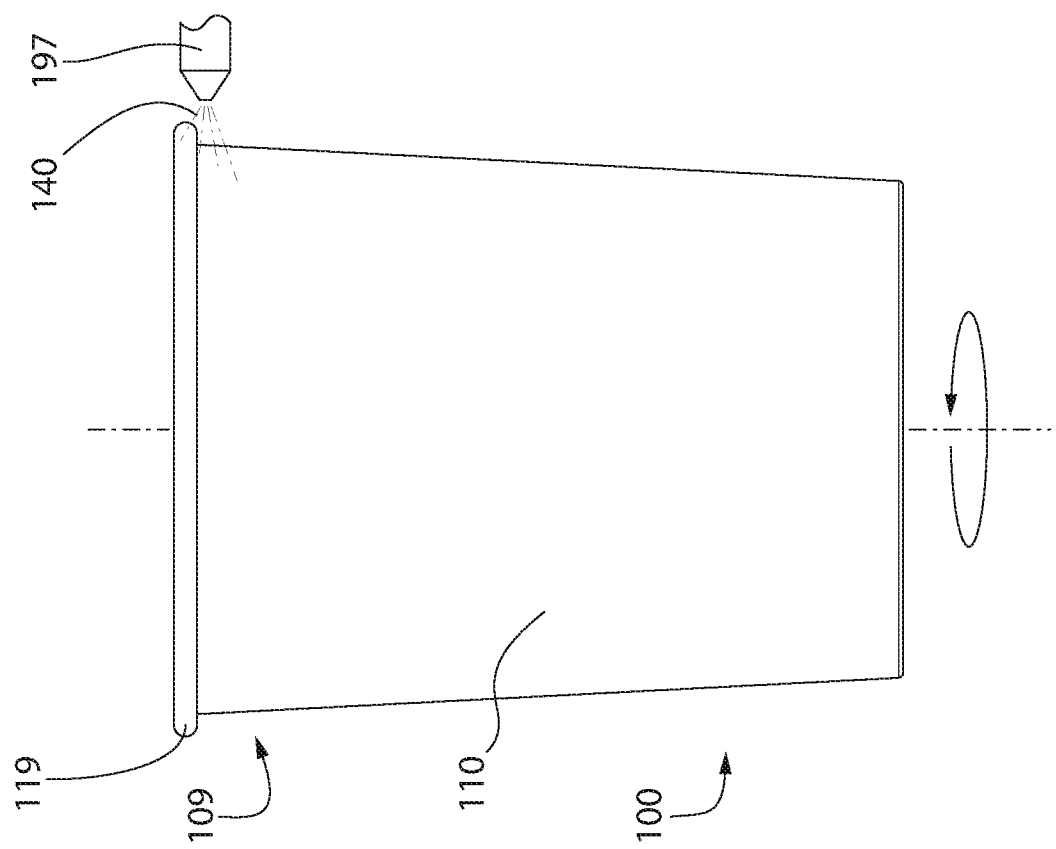

FIGS. 4A and 4B illustrate the coating material 140 being applied onto the portion 109 of the paper cup 100 via a spray mechanism 197. That is, the spray mechanism 197 may be operably coupled to a source of the coating material 140 (not shown, but the source may be any of a reservoir, trough, container, or the like that contains the coating material 140), and the spray mechanism 197 may be activated to spray the coating material 140 onto the portion 109 of the paper cup 100. The spraying process may be performed automatically during or after the cup manufacturing process using various machinery and processors, or operation of the spray mechanism 197 may be controlled by an operator. The paper cup 100 may be coated along the portion 109 thereof along an entire circumference of the paper cup 100. Thus, the paper cup 100 may be rotated as the coating material 140 is sprayed out of the spray mechanism 197 as shown in FIG. 4A, or alternatively the spray mechanism 197 may be moved around the circumference of the paper cup 100 to coat the portion of the paper cup 100 with the coating material 140.

FIGS. 5A and 5B illustrate the coating material being applied onto the portion of the paper cup 100 via a rolling mechanism 198. In such an embodiment, the rolling mechanism 198 may be dipped in the coating material and then positioned into contact with the portion 109 of the paper cup 100 to which the coating material 140 is to be applied. Then, either the paper cup 100 may be rotated about its own axis as shown with the arrow in FIG. 5A or the rolling mechanism 198 may be moved around the circumference of the paper cup 100 along the portion 109 of the paper cup 100 to apply the coating material 140 thereon. Contact between the rolling mechanism 198 and the paper cup 100 will result in the coating material 140 being applied onto the portion 109 of the paper cup 100, much like using a rolling brush when painting a wall. In the exemplified embodiment, the rolling brush includes an annular recess 196 within which the rim 119 of the paper cup 100 nests during the application of the coating material 140 onto the portion 109 of the paper cup 100. This ensures that adequate surface contact between the outer surface of the rim 119 and the floor of the annular recess 196 is achieved so that the coating material 140 is applied to the rim 119.

FIGS. 6A and 6B illustrate the coating material 140 being applied onto the paper cup 100 by dipping the portion 109 of the paper cup 100 into a trough 199 containing the coating material 140. The trough 199 may be any container that is open at its top end so that the paper cup 100 can be inserted therein. The paper cup 100 may be inverted so that its top end and rim 119 are facing downwardly, and then inserted into the reservoir of the trough 199 to be directly coated with the coating material 140. The depth to which the paper cup 100 is inserted into the trough 199 will dictate the amount of the paper cup 100 that will become coated with the coating material 140. That is, the depth to which the paper cup 100 is inserted into the trough 199 dictates the height or length of the portion 109 of the paper cup 100 which is coated with the coating material 140. Using this method, the inner and outer surfaces of the sidewall 110 along the portion 109 of the sidewall 110 will be simultaneously coated with the coating material 140.

Any of the methods depicted in FIGS. 4A-6B may be used to coat the portion 109 of the paper cup 100 with the coating material 140. However, the spray method shown in FIGS. 4A and 4B may require an additional spray mechanism on the interior of the paper cup 100 if it is desired to also coat a portion of the inner surface 111 of the sidewall 110 of the paper cup 100 with the coating material 140. Similarly, an additional rolling mechanism 198 may be needed in accordance with the rolling method shown in FIGS. 5A and 5B if there is a desire to coat a portion of the inner surface 111 of the sidewall 110 of the paper cup 100 with the coating material 140.

Figure 7:
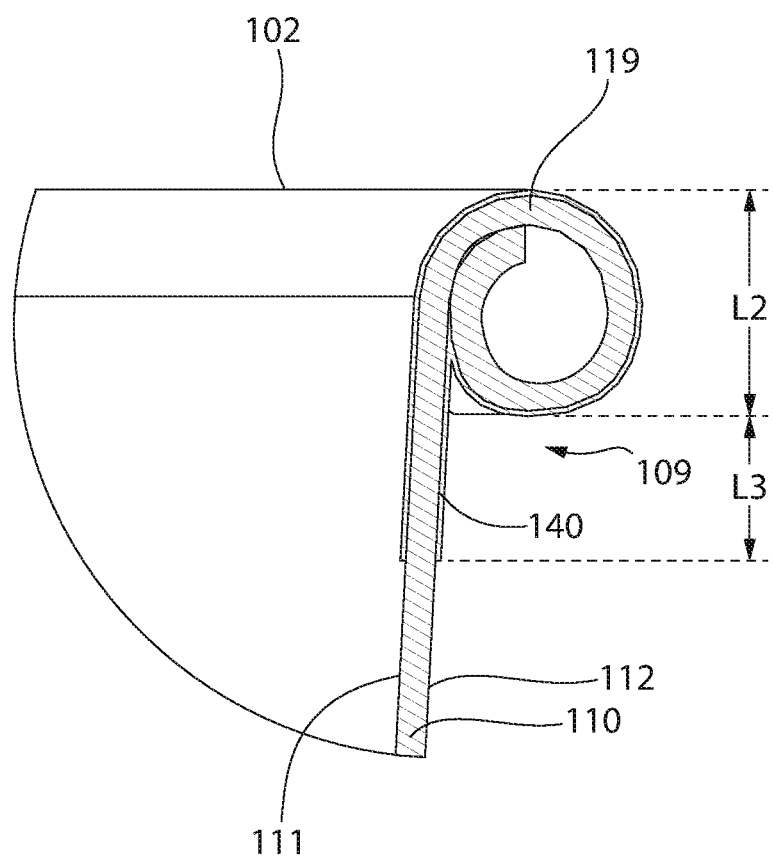
FIG. 7 is a cross-sectional view taken along line VII of FIG. 4B.

Referring to FIGS. 4B and 7, the paper cup 100 with the coating material 140 thereon will be described. Although the paper cup 100 and coating material 140 are being described with reference to FIG. 4, it is noted that the same description is applicable regardless of the manner in which the coating material 140 is applied onto the paper cup 100. Thus, if the spraying method of FIG. 4A, the rolling method of FIG. 5A, the dipping method of FIG. 6A, or any other method are used, the resultant structure, which will be described below with reference to FIGS. 4B and 7, remains the same.

The coating material 140 is selected as a material that, after being coated onto the paper cup 100, will harden either as a result of the passage of time or due to the application of an external process thereto. For example, in some embodiment, after applying the coating material 140 onto the paper cup 100, the portion 109 of the paper cup 100 that is coated with the coating material 140 may be subjected to a curing process. For example, after applying the coating material 140 onto the portion 109 of the paper cup 100, ultraviolet radiation may be applied onto the portion 109 of the paper cup 100 to cure the coating material 140, which cause the coating material 140 to harden and form a rigid shell. Thus, for example without limitation, the coating material 140 may be a thermosetting polymer that is coated onto the paper cup 100 in a liquid form and then cured into a solid form to form the rigid shell. Although ultraviolet radiation may be applied onto the portion 109 of the paper cup 100 to facilitate curing of the coating material 140, in other embodiments the mere passage of time will cause the coating material 140 to cure and harden on the paper cup 100. Moreover, applying ultraviolet radiation is one way to speed up the curing process, but in other embodiments the curing process may be sped up by applying heat, electron beams, or chemical additives onto the portion 109 of the paper cup 100 that is covered with the coating material 140 to cure and harden the coating material 140. Once cured, the coating material 140 forms a rigid shell that may encapsulate a portion of the paper cup 100. The coating material 140, once cured, has a hardness that is greater than a hardness of the paper-based material which is used to form the paper cup 100.

As mentioned previously, the paper cup 100 comprises the sidewall 110 having the inner surface 111 and also an outer surface 112 which is opposite the inner surface 111. The sidewall 110 also comprises the bottom end 101 and the top end 102, with the top of the rim 119 forming the top end 102 of the sidewall 110. The outer surface 112 of the sidewall 110 is deemed to be the portions of the sidewall 110 which are visible when the paper cup 100 is viewed externally. Thus, the portion of the rim 119 which is exposed to view in FIG. 4B forms a part of the outer surface 112 of the sidewall 110.

In the exemplified embodiment, the coating material 140 covers at least the portion of the outer surface 112 of the sidewall 110 which is formed by the rim 119. More specifically, in the exemplified embodiment the coating material 140 covers a portion of the outer surface 112 of the sidewall 110 positioned directly below the rim 119, a portion of the outer surface 112 of the sidewall 110 which is formed by the rim 119, the top end 102 of the sidewall 110, and a portion of the inner surface 111 of the sidewall 110 which is aligned with the rim 119 and with the portion of the outer surface 112 of the sidewall 110 which is positioned directly below the rim 119. As noted above, once the coating material 140 cures, it hardens and forms a rigid shell that encapsulates at least the rim 119 of the paper cup 100, as shown in FIG. 7. The coating material 140 may also encapsulate portions of the sidewall 110 immediately below the rim 119, as shown in FIG. 7.

In the exemplified embodiment, the sidewall 110 of the paper cup 110 has a length L1 measured from the bottom end 101 to the top end 102 measured in a direction of the axis B-B of the paper cup 100. Furthermore, the coating material 140 covers the portion 109 of the paper cup 100, with the portion 109 of the paper cup 100 comprising no more than 10% of the length L1 of the sidewall 110. The remaining 90% of the sidewall 110 is free of the coating material 140. Stated another way, the rim 119 has a length L2 measured in the direction of the axis B-B. The coating material 140 covers the rim 119, a portion of the outer surface 112 of the sidewall 110 located immediately beneath the rim 119, the top end 102 of the sidewall 110, and a portion of the inner surface 111 of the sidewall 110 that is aligned with the rim 119 and with the portion of the outer surface 112 of the sidewall 110 that is immediately beneath the rim 119. Moreover, in the exemplified embodiment the portion of the outer surface 112 of the sidewall 110 located immediately beneath the rim 119 has a length L3 that is no more than three times the length L2 of the rim 119, or more specifically no more than two times the length L2 of the rim 119. In some embodiments, the length L3 of the portion of the outer surface 112 of the sidewall 110 that is located immediately beneath the rim 119 may be less than the length L2 of the rim 119.

Thus, in the exemplified embodiment, the coating material 140 covers a portion of the inner surface 111 of the sidewall 110, a portion of the outer surface 112 of the sidewall 110, and the top end 102 of the sidewall 110. Thus, the portion 109 of the sidewall 110 that is covered by the coating material 140 is covered by the coating material 140 on both opposing surfaces (i.e., the inner and outer surfaces 111, 112) thereof. Thus, as set forth herein, the rigid shell formed by the coating material 140 encapsulates the portion 109 of the sidewall 110.

The portion 109 of the sidewall 110 that is coated and encapsulated by the coating material 140 is an upper portion of the sidewall 110. A lower portion of the sidewall 110 is not covered by the coating material 140 at all. The lower portion of the sidewall 110 which is not covered by the coating material 140 may comprise at least 50%, or at least 60%, or at least 70%, or at least 80%, or at least 90% of the length of the sidewall 110. Thus, the coating material 140 is only located on the rim 119 of the sidewall 110 and regions of the sidewall 110 that are immediately adjacent to the rim 119. In the exemplified embodiment, the coating material 140 is located on the portion 109 of the sidewall 110, which includes no more than 10% of the length L1 of the sidewall 110, and the remaining portions of the sidewall 110 remains free of the coating material 140.

As shown in FIG. 7, in some embodiments the coating material 140 does not just cover the outer surface 112 of the portion 109 of the sidewall 110, but it also wraps around the top end 102 of the sidewall 110 and covers the inner surface 111 of the sidewall 110 along the portion 109 of the sidewall 110. Thus, the coating material 140 encases or encapsulates the portion 109 of the sidewall 110 including covering the inner surface 111, outer surface 112, and top end 102 of the sidewall 110 along the portion 109 thereof, which is an upper portion of the sidewall 110.

It should be appreciated that the coating material 140 is not intended to be removed from the paper cup 100 prior to use, and thus the coating material 140 is generally non-detachable relative to the paper cup 100. Of course, it may be possible to remove the coating material 140 from the paper cup 100 prior to drinking therefrom, such as by scraping the coating material 140 from the paper cup 100, applying a chemical to the coating material 140 to facilitate its removal, or the like, but there is no reason to do so. That is, the coating material 140 is formed from a food grade material so it is safe for a user to put the rim 119 against the user's lips while drinking from the paper cup 100. Thus, the coating material 140 is generally fixedly and non-removably coupled to the paper cup 100. Moreover, in some embodiments the coating material 140 may be transparent such that it may not be perceptible to a user, but rather will blend in with the portion 109 of the sidewall 110 upon which it is located.

Because the coating material 140 hardens to form the rigid shell as noted herein, the cup dispensing mechanism of a beverage vending machine is less likely to roll over the rim 119 of the paper cup 100 during dispensing. Specifically, due to the increased rigidity of the rim 119 because it is encased in the rigid shell of the coating material 140, the scrolls of the cup dispensing mechanism will press the lower cup downwardly away from the remainder of the stack without rolling over the rim 119.

Figure 8A:
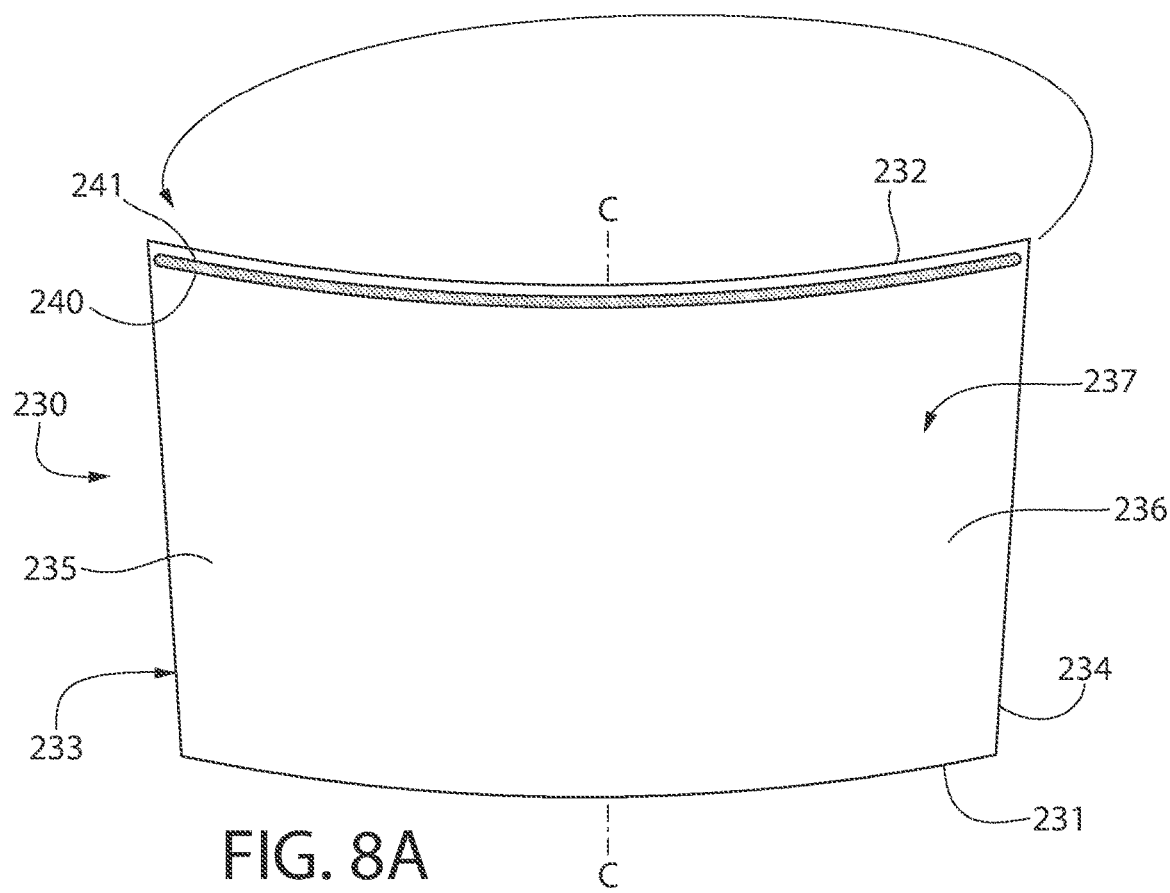
FIG. 8A is a view of a cup blank with a filler material applied thereon.
Figures 8B, 8C:
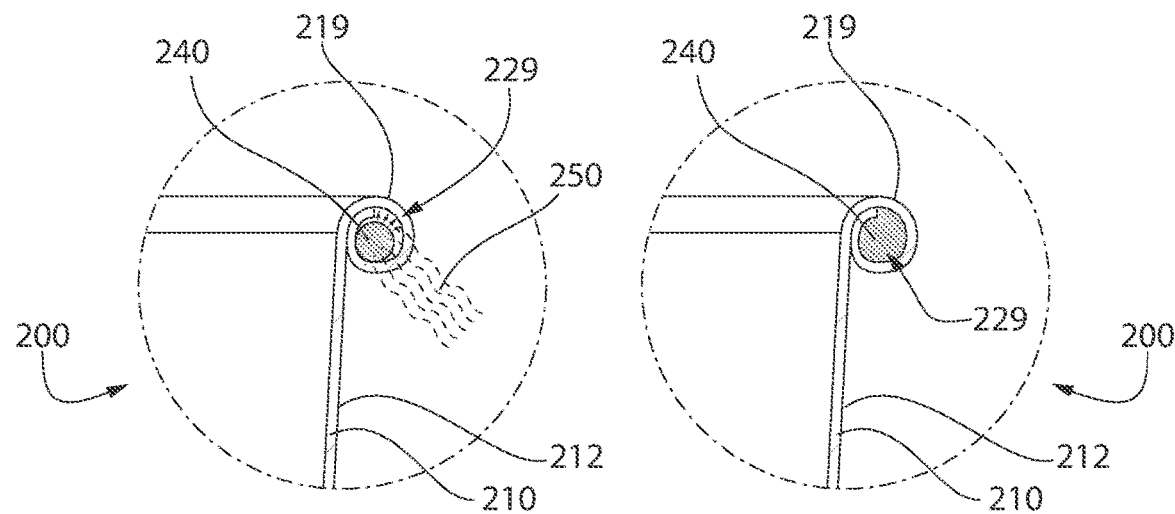
FIG. 8B is a cross-sectional view of a portion of a cup formed from the cup blank of FIG. 8A whereby the filler material is being heated or cured.
FIG. 8C is the cross-sectional view of the portion of the cup shown in FIG. 8B illustrating the filler material having expanded to fill a void defined by a rim of the cup.

Referring to FIGS. 8A-8C, a method of forming a paper cup 200 will be described in accordance with another embodiment of the present invention. The paper cup 200 formed by the method of FIGS. 8A-8C is identical to the paper cup 100 described above with reference to FIGS. 1-3F. That is, the paper cup 200 includes a sidewall 210 and a floor portion (not visible in the figures) that are identical to that which was described above with reference to the paper cup 100. The paper cup 200 is not shown in full in this embodiment, but it should be appreciated that the description and illustrations of the paper cup 100 above with reference to FIGS. 1-3F is entirely applicable to the paper cup 200, with the additional disclosure set forth herein below.

FIG. 8A illustrates a cup blank 230 that is used to form the sidewall 210 of the paper cup 200. The cup blank 230 comprises a bottom edge 231, a top edge 232, a first side edge 233, and a second side edge 234. The cup blank 230 extends along an axis C-C from the bottom edge 231 to the top edge 232. As was described above with reference to FIGS. 3A and 3B, the cup blank 230 is manipulated or rolled into a cylindrical or conical shape to form the sidewall 210 of the paper cup 200, as shown by the arrow above the cup blank 230 in FIG. 8A. The cup blank 230 is manipulated into the cylindrical or conical shape so that a first edge portion 235 that includes the first edge 233 overlaps a second edge portion 236 that includes the second edge 234, and then the cup blank 230 is bonded to itself along the overlap of the first and second edge portions 235, 236. The cup blank 230 can be bonded to itself via adhesive, ultrasonic bonding, or the like.

The cup blank 230 comprises a surface 237, which is the surface that is visible in FIG. 8A. The cup blank 230 has an opposing surface which is not visible in FIG. 8A. The cup blank 230 is a flat, planar sheet of paper material. In the exemplified embodiment, the cup blank 230 has a trapezoidal shape (although it may have rounded/arcuate bottom and top ends 231, 232), which is necessary to form the sidewall 210 with a conical shape. In other embodiments the cup blank 230 may have other shapes depending on the shape of the sidewall 210 it is used to form.

In accordance with the exemplified embodiment, a filler material 240 is applied onto the surface 237 of the cup blank 230 prior to manipulating the cup blank 230 into the cylindrical or conical shape to form the sidewall 210 of the cup 20. More specifically, the filler material 240 is applied onto the surface 237 of the cup blank 230 adjacent to the top edge 232 of the cup blank 230. The filler material 240 is applied onto the surface 237 of the cup blank 230 along a line that is generally transverse to the axis C-C of the cup blank 230. Upon manipulating the cup blank 230 into the conical or cylindrical shape, the surface 237 of the cup blank 230 becomes the outer surface 212 of the sidewall 210. Thus, when the cup blank 230 is manipulated into the conical or cylindrical shape of the sidewall 210, the filler material 240 is positioned on the outer surface 212 of the sidewall 210.

Furthermore, a distance between a top edge 241 of the filler material 240 and the top edge 232 of the cup blank 230 (prior to forming the sidewall 210 from the cup blank 230) is constant along an entirety of the filler material 240. This is important because, as noted above, during formation of the cup, a top portion of the sidewall 210 is curled or rolled to form a rim 219. The filler material 240 is positioned on the surface 237 of the cup blank 230 adjacent to the top edge 232 of the cup blank 230 so that upon curling or rolling the top portion of the sidewall 210 to form the rim 219, the filler material 240 is disposed within a void 229 defined by the rim 219. That is, when the top portion of the sidewall 210 is rolled to form the rim 219, the rim 219 surrounds a space that is filled with air (i.e. the void 229), and the filler material 240 is disposed within the void 229, as shown in FIG. 8B. When the rim 219 is formed, the filler material 240 is positioned within the void 229 of the rim 219 and the filler material 240 is completely enclosed within the rim 219 so that none of the filler material 240 is exposed. That is, the filler material 240 cannot be seen by viewing the paper cup 200 without tearing the rim 219.

In the exemplified embodiment, the filler material 240 is an expandable material such that it expands and hardens upon passage of time or application of heat, ultraviolet radiation, other types of electromagnetic radiation, or the like thereto. In one embodiment, the filler material 240 is applied onto the surface 237 of the cup blank 230 via a printing process. That is, the filler material 240 may be formed by an ink and unexpanded microspheres that are embedded within the ink, with the unexpanded microspheres being configured to expand upon application of heat thereto. The ink and unexpanded microspheres may be printed onto the surface 237 of the cup blank 230. However, the invention is not to be so limited in all embodiments and the filler material 240 may take on other forms. That is, the filler material 240 may be an adhesive, a solid pulp structure, a strand of material formed from paper, or other materials that are not incompatible with the recyclability of the remainder of the paper cup 200.

Referring to FIG. 8B, the filler material 240 is illustrated positioned within the void 229 formed by the rim 219. Thus, FIG. 8B illustrates a portion of the paper cup 200 that includes the rim 219 in cross-section so that the filler material 240 is visible within the void 229. In accordance with the exemplified embodiment, the filler material 240 is an expandable material that expands upon application of heat thereto. Thus, in FIG. 8B heat 250 is being applied to the rim 219 and the filler material 240 disposed within the void 229 thereof. As shown in FIG. 8C, as a result of the application of heat to the rim 219 and filler material 240, the filler material 240 expands in volume to fill an entirety of the void 229. That is, in FIG. 8B, prior to the filler material 240 expanding, there remains air in the void 229 between the filler material 240 and the portion of the sidewall 210 that forms the rim 219. By applying heat to the filler material 240, the filler material expands in volume so that it fills the entire void 229 and there are no air spaces remaining between an outer surface of the filler material 240 and an inner surface of the rim 219.

Moreover, in certain embodiments, after the filler material 240 expands to fill the void 229, the filler material 240 may harden to form a structurally rigid material that is disposed within the void 229 of the rim 219. In the exemplified embodiment, the sidewall 210 and floor portion (not visible, but refer to the floor portion 121 of the floor member 120 of FIG. 2) are formed from a paper material and the filler material 240, upon hardening, has a hardness that is greater than a hardness of the paper material. Thus, once the filler material 240 fills the void 229 and hardens, the rim 219 is no longer capable of being compressed into the void 229 despite the fact that the rim 219 is formed from paper. As a result, when the paper cup 200 is used in a beverage vending machine, the dispensing mechanisms will not deform the rim 219 and as a result the cups will be dispensed consistently and without failure.

Figure 9A:
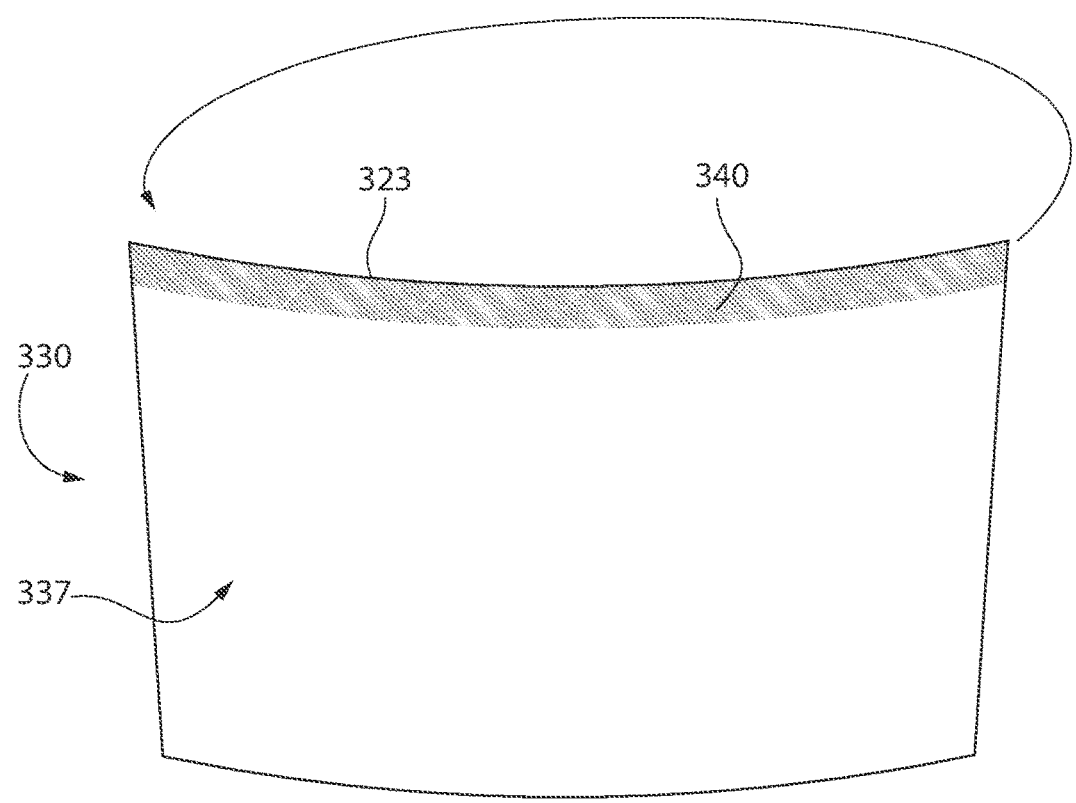
FIG. 9A is a view of a cup blank with a filler material applied thereon.
Figures 9B, 9C:
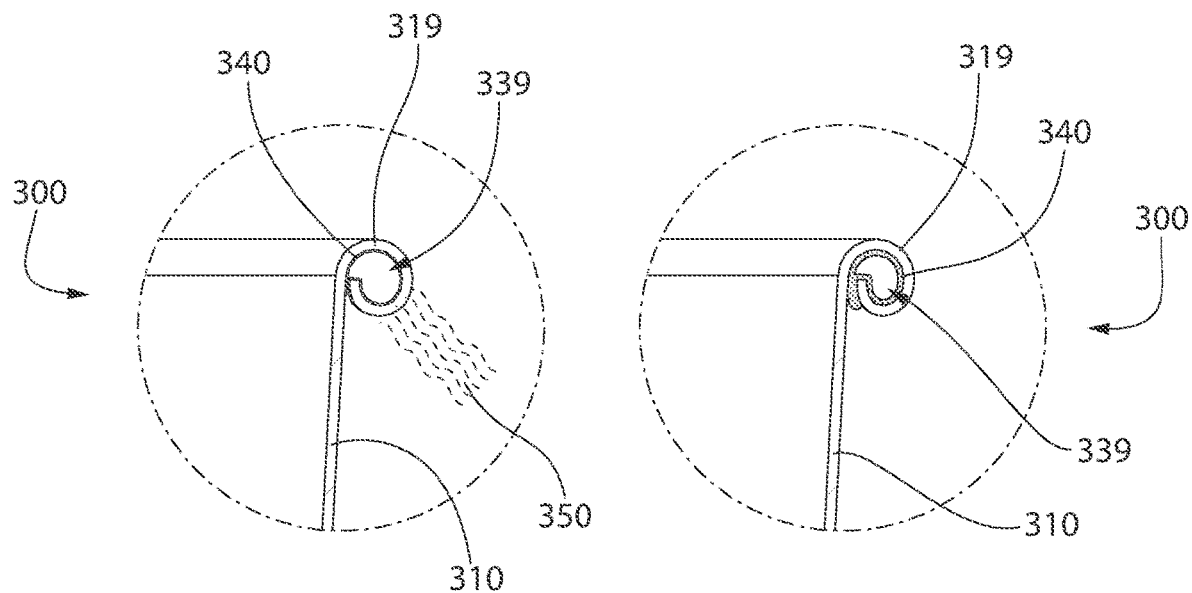
FIG. 9B is a cross-sectional view of a portion of a cup formed from the cup blank of FIG. 9A whereby the filler is being heated or cured.
FIG. 9C is the cross-sectional view of the portion of the cup shown in FIG. 9B illustrating the filler material located in a void defined by a rim of the cup.

Referring briefly to FIGS. 9A-9C, another embodiment of a paper cup 300 is illustrated, which is very similar to the paper cup 200 described above. The paper cup 300 is formed from a cup blank 330 that is manipulated into a cylindrical or conical shape to form a sidewall 310 of the paper cup 300. A top portion of the sidewall 310 is then curled to form a rim 319 of the paper cup 300. However, prior to manipulating the cup blank 330 into the cylindrical or conical shape, an adhesive material 340 is applied onto a surface 337 of the cup blank 330 adjacent to a top edge 323 of the cup blank 330.

This embodiment is identical to the embodiment previously described, except that application of heat 350 to the adhesive material 340 as shown in FIG. 9B causes the adhesive material 340 to expand, but not to the extent of filling the entirety of the void 339 of the rim 319. Thus, as shown in FIG. 9C, even after expanding the adhesive material 340 due to application of the heat 350 thereto, there remains an air gap within the void 339 defined by the rim 319.

Referring now to FIGS. 10A-10C, another embodiment of a paper cup 400 is illustrated and will be described. The paper cup 400 comprises a sidewall 410 and a floor portion 421 as with the paper cups previously described. The sidewall 410 has a cylindrical or more preferably a conical shape. The sidewall 410 comprises an inner surface 411 that faces an interior passageway and an outer surface 412 opposite the inner surface. The sidewall 410 extends from a bottom end 401 which defines a first opening into the interior passageway of the sidewall 410 and a top end 402 which defines a second opening into the interior passageway of the sidewall 410.

The floor portion 421 may be formed as a part of a floor member 420, similar to that which has been described above. That is, the floor member 420 may comprise the floor portion 421 and an annular flange portion 422. The annular flange portion 422 may be sandwiched between a folded lower portion of the sidewall 410 and bonded thereto, with the floor portion 421 extending horizontally across the interior passageway defined by the sidewall 410. The inner surface 411 of the sidewall 410 and the floor portion 421 collectively define a cavity 415 that is configured to hold liquids such as soups, beverages, or the like for user consumption. The cavity 415 extends along a cavity axis D-D. There may be a powder ingredient 490 pre-filled in the cavity 415 prior to making a beverage so that the paper cups 400 may be stacked as shown in FIG. 10B and used in a beverage vending machine as has been described herein.

In this embodiment, the sidewall 410 has a constant thickness from the floor portion 421 to the top end 402 (the thickness of the sidewall 410 below the floor portion 421 is doubled because the bottom portion of the sidewall 410 is folded to capture the annular flange portion 422 of the floor member 420 for coupling the floor member 420 to the sidewall 410 as described herein). That is, the sidewall 410 is not curled to form a rim at its top end. Instead, the sidewall 410 simply terminates at the top end 402. The sidewall 410 and the floor member 420 are formed from paper-based material as described herein.

In this embodiment, there is a separate rim component 430 that is attached to the sidewall 410 along a top portion 414 of the sidewall 410, the top portion 414 of the sidewall 410 comprising the top end 402 of the sidewall 410 and a portion of the sidewall 410 immediately adjacent to and below the top end 402 of the sidewall 410. The top portion 414 of the sidewall 410 may be a portion of the sidewall 410 that extends no more than 10% of a length of the sidewall 410 from the top end 402 downwardly towards the bottom end 401 in some embodiments.

The rim component 430 is formed from a paper material like the sidewall 410 and the floor member 420. However, in the exemplified embodiment the rim component 430 may be formed from molded paper pulp fibers so that the rim component is a solid, non-hollow structure. The rim component 430 may be formed from a dry molding process or a wet molding process in different embodiments while forming the same structure. Specifically, in some embodiments the rim component 430 may be formed as a dry molded fiber, which comprises forming dry pulp fibers into a low density cellulose web using air and then compressing the cellulose web with a plate press that compacts the dry pulp fibers into a mold that shapes the dry pulp fibers into the rim component 430. Of course, other paper molding techniques (i.e., molded fiber molding, paper pulp molding, etc.) may be used to form the rim component 430. For example, in one embodiment a slurry may be made from ground paper or fiber dissolved in water, and then a mold may be dipped into the slurry. Next, a vacuum on the backside may pull the slurry onto the mold to form the desired shape, which may take on the shape of the rim component 430 as shown in FIGS. 10A and 10C. The molded article may be ejected from the mold and placed in a drying oven. Thus, the rim component 430 may be formed from a dry paper molding process, a wet paper molding process, or the like in various different embodiments.

Of course, it may be possible to form the rim component 430 out of other materials, such as bioplastics, wood, metal, or the like. However, in accordance with the invention set forth herein, it is preferable to form the rim component 430 out of paper products so that the cup 400 comprising the sidewall 410, the floor member 420, and the rim component 430 are all formed from paper and can therefore be successfully recycled in normal paper waste streams. By forming the rim component 430 by paper pulp molding, the rim component 430 is a solid structure and the rim (described below) is solid and non-hollow so that it cannot be readily compressed as with traditional rims formed by curling the sidewall of the cup.

The rim component 430 comprises a rim portion 431 and a flange portion 432. The flange portion 432 has an inner surface 433 and an outer surface 434. The rim portion 431 protrudes radially outward beyond the outer surface 434 of the flange portion 432 and has a shape which is similar to the shape of rims on conventional paper cups, other than the fact that the rim portion 431 is solid as opposed to being hollow and defining a void as with rims on conventional paper cups. The flange portion 432 has a thickness measured between the inner and outer surfaces 433, 434. Because the rim component 430 is formed from molded pulp fibers, the flange portion 432 is a solid structure and has no voids, air gaps, or the like between the inner and outer surfaces 433, 434.

In the embodiment of FIGS. 10A-10C, the rim component 430 is coupled to an outside of the sidewall 410. More specifically, the inner surface 433 of the flange portion 432 of the rim component 430 is positioned adjacent to the outer surface 412 of the sidewall 410 so that the flange portion 432 surrounds the outer surface 412 of the sidewall 410. The inner surface 433 of the flange portion 432 of the rim component 430 is then attached or otherwise bonded to the outer surface 412 of the sidewall 410. The flange portion 432 of the rim component 430 may be bonded to the sidewall 410 using adhesives, ultrasonic bonding, welding, or the like.

Although in the exemplified embodiment, the sidewall 410 is formed in its conical shape before attaching the rim component 430, the invention is not to be so limited in all embodiments. Specifically, in some embodiments the cup blank that is used to form the sidewall 410 may be wrapped around the rim component 430 and then glued or welded thereto to affix the sidewall 410 and the rim component 430 together. There should be a reasonable amount of overlap between the rim component 430 and the sidewall 410 to ensure that the rim component 430 remains coupled to the sidewall 410 during normal use and handling. In some embodiments, the flange portion 432 of the rim component 430 which entirely overlaps with the sidewall 410 may have a length of between 3 mm and 20 mm, or 3 mm and 10 mm, or may extend along between 5% and 20% of the length of the sidewall 410. In some embodiments, the rim component 430 may overlap the sidewall 410 along at least 10% of the length of the length of the sidewall 410, or between 10% and 20% of the length of the sidewall 410.

FIG. 10C illustrates the cup 400 with the rim component 430 coupled to the sidewall 410. In this embodiment, the rim portion 431 of the rim component 430 protrudes above the top end 402 of the sidewall 410 and also protrudes radially outward from the sidewall 410 in a direction away from the cavity axis D-D. The rim portion 431 of the rim component 430 comprises an underside surface 435 which extends from the outer surface 434 of the flange portion 432 to a distal-most end 436 of the rim portion 431.

In this embodiment, the inner surface 433 of the flange portion 432 of the rim component 430 lays flush against (i.e., in intimate surface contact with) the outer surface 412 of the sidewall 410 (although there may be an adhesive layer therebetween in some embodiments). Thus, the inner surface 433 of the flange portion 432 is angled outwardly relative to the cavity axis D-D at the same angle as the sidewall 410. However, the outer surface 434 of the flange portion 432 is not similarly angled, but is instead oriented parallel to the cavity axis D-D. This improves stackability of the cups 400 as shown in FIGS. 10B and 10C and shown below. Due to this difference in orientation between the inner and outer surfaces 433, 434 of the flange portion 432 of the rim component 430, the thickness of the flange portion 432 of the rim component 430 continuously increases moving from the rim portion 431 to a bottom edge 437 of the flange portion 432.

Moreover, the bottom edge 437 of the flange portion 432 forms a ledge that protrudes outwardly from the outer surface 412 of the sidewall 410. When the cups are arranged in a stack 405 as shown in FIGS. 10B and 10C, the bottom edge or ledge 437 of the flange portion 432 of the rim component 430 of each cup 400 in the stack 405 rests atop of a top end 438 of the rim portion 431 of the flange portion 432 of the cup 400 positioned immediately below. This maintains a spacing between the cups 400 in the stack 405 and prevents an upper cup in the stack 405 from being pushed too far into the cavity 415 of a lower cup in the stack 405, which could taper lock those two adjacent cups together and make it more difficult for the beverage vending machine to separate the cups 400 during a cup dispensing operation. Thus, the rim portions 431 of the rim components 430 of adjacent cups in the stack 405 are spaced apart by a distance equal to a length of the flange portion 432 of the rim component 430 of the upper cup in the stack 405.

Figure 11:
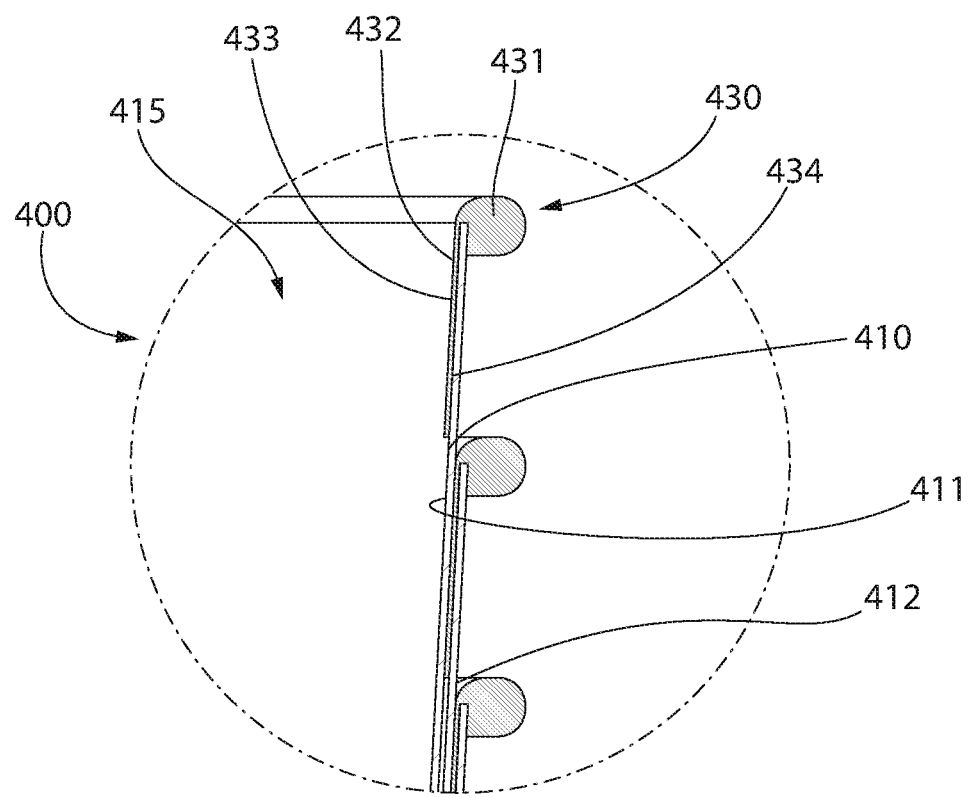
FIG. 11 is the close-up view of area XC in accordance with a first alternative embodiment of the present invention.

Referring to FIG. 11, the paper cup 400 of FIGS. 10A-10C will be described with a minor modification. Particularly, in FIG. 11 the flange portion 432 of the rim component 430 is positioned within the cavity 415 rather than being positioned around the outside of the sidewall 410. That is, in this embodiment the outer surface 434 of the flange portion 432 is in intimate surface contact with the inner surface 411 of the sidewall 410 along the top portion 414 of the sidewall 410. The rim portion 431 of the rim component 430 still protrudes radially outward from the outer surface 412 of the sidewall 410 in a manner similar to the rim of a conventional paper cup. Furthermore, just like in the embodiment of FIGS. 10A-10C, the rim portion 431 protrudes above the top end 402 of the sidewall 410.

The embodiment of FIG. 11 may be preferable to the embodiment of FIG. 10A-10C in some embodiments, because it allows for the flange portion 432 of the rim component 430 to be hidden from view. As a result, the paper cup 400 with the rim component 430 attached as shown in FIG. 11 has a visual appearance that more closely resembles the appearance of a conventional paper cup. However, one downside to this arrangement is that the bottom end of the flange portion 432 cannot contact the top end of the rim portion 431 of a lower cup in a stack of the cups 400. Thus, other features may be needed to ensure adequate spacing between the cups 400 when stacked to prevent a taper lock and facilitate proper cup dispensing when the cups 400 are used in a beverage vending machine.

Figure 12:
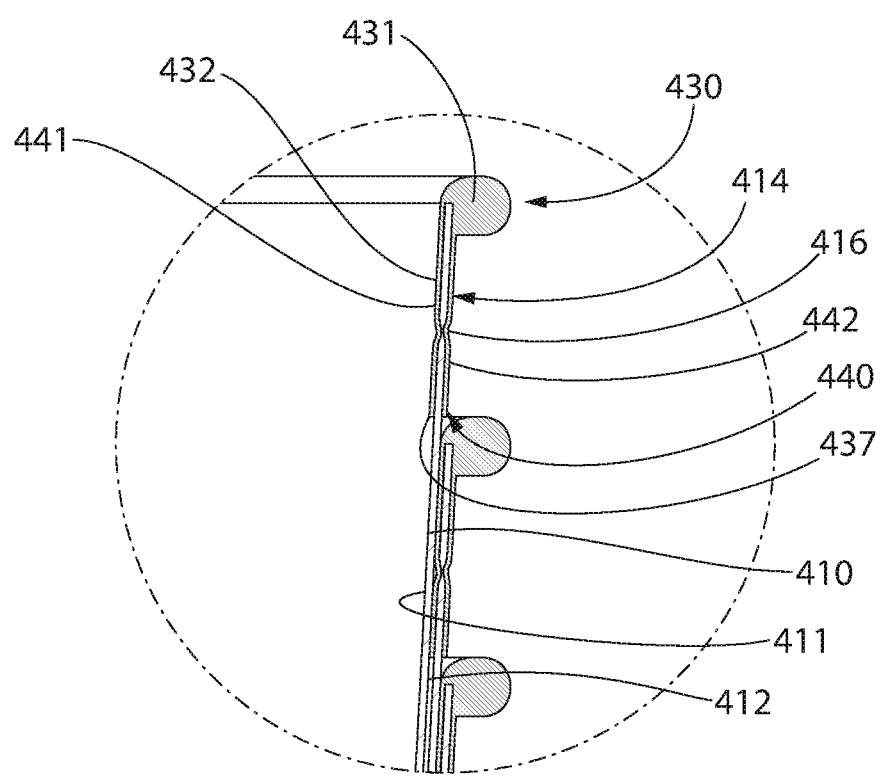
FIG. 12 is the close-up view of area XC in accordance with a second alternative embodiment of the present invention.

Finally, referring to FIG. 12, the paper cup 400 of FIGS. 10A-10C will be described with yet another modification. In this embodiment, the flange portion 432 of the rim component 430 comprises a channel 440 that extends from the bottom end 437 thereof upwardly towards the rim portion 431. The flange portion 432 is coupled to the sidewall 410 by inserting the top portion 414 of the sidewall 410 into the channel 440 defined by the flange portion 432 so that the flange portion 432 of the rim component 430 encapsulates the top portion 414 of the sidewall 410. Thus, in this embodiment a first portion 441 of the flange portion 432 located on a first side of the channel 440 is adjacent to the inner surface 411 of the sidewall 410 and a second portion 442 of the flange portion 432 located on a second side of the channel 440 is adjacent to the outer surface 412 of the sidewall 410.

In this embodiment, the first portion 441 of the flange portion 432 may be coupled (bonded via adhesive, welding, or the like) to the inner surface 411 of the sidewall 410 and the second portion 442 of the flange portion 432 may be coupled (bonded via adhesive, welding, or the like) to the outer surface 412 of the sidewall 410. In the exemplified embodiment, the sidewall 410 may comprise one or more openings 416 positioned along the top portion 414 of the sidewall 410, each of the openings 416 extending through the thickness of the sidewall 410 from the inner surface 411 to the outer surface 412. The first and second portions 441, 442 of the flange portion 432 of the rim component 430 may extend into and/or through the openings 416 and be coupled together to attach the rim component 430 to the sidewall 410. This may be done in addition to the direct coupling of the flange portion 432 of the rim component 430 to the inner and/or outer surfaces 411, 412 of the sidewall 410 or as an alternative to (i.e., instead of) the coupling to the inner and outer surfaces 411, 412 of the sidewall 410.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A paper cup comprising:
a sidewall;
a floor portion;
a cavity having a cavity axis defined by the sidewall and the floor portion;
a rim component comprising a rim portion and a flange portion, the flange portion being bonded to a top portion of the sidewall and the rim portion protruding radially outward beyond an outer surface of the flange portion;
wherein the sidewall, the floor portion, and the rim component are all formed from one or more paper-based materials; and
wherein the rim portion comprises a downwardly facing shoulder that rests atop of a top edge of the sidewall, and wherein no portion of the rim component is located radially inward of an inner surface of the sidewall.

2. The paper cup according to claim 1 wherein the rim component is a separate component from the sidewall, and wherein the rim component is formed from molded paper pulp fibers so that the rim portion of the rim component is solid and non-hollow.

3. The paper cup according to claim 1, wherein the flange portion of the rim component is positioned adjacent to an outer surface of the sidewall so that the flange portion of the rim component surrounds a portion of the outer surface of the sidewall.

4. The paper cup according to claim 3 wherein a bottom edge of the flange portion of the rim component forms a ledge that protrudes from the outer surface of the sidewall.

5. The paper cup according to claim 4 wherein upon stacking two or more of the paper cups to form a stack, the bottom edge of the flange portion of the rim component of each cup in the stack rests atop of a top end of the rim portion of the rim component of an immediate lower cup in the stack to maintain a spacing distance between adjacent cups in the stack.

6. The paper cup according to claim 1 wherein the rim portion of the rim component is solid and non-hollow.

7. The paper cup according to claim 1 wherein the rim component overlaps the sidewall along between 10% and 20% of the length of the sidewall.

8. The paper cup according to claim 1 wherein the sidewall and the floor portion are free of any polyethylene.

9. The paper cup according to claim 1 wherein at least a portion of the rim portion of the rim component protrudes beyond a top edge of the sidewall.

10. The paper cup according to claim 1 wherein the rim component is a monolithic structure comprising the flange portion and the rim portion.

11. The paper cup according to claim 1 wherein a lower portion of the rim portion of the rim component overlaps the sidewall and wherein an upper portion of the rim portion of the rim component protrudes beyond a top edge of the sidewall in a direction of the cavity axis.

12. The paper cup according to claim 1 wherein the rim portion of the rim component comprises an exposed underside surface that faces downwardly in a direction towards the floor portion.

13. A paper cup comprising:
a sidewall;
a floor portion;
a cavity having a cavity axis defined by the sidewall and the floor portion;
a rim component comprising a rim portion and a flange portion, the flange portion being bonded to a top portion of the sidewall and the rim portion protruding radially outward beyond an outer surface of the flange portion;
wherein the sidewall, the floor portion, and the rim component are all formed from one or more paper-based materials;
wherein the flange portion of the rim component is positioned adjacent to an outer surface of the sidewall so that the flange portion of the rim component surrounds a portion of the outer surface of the sidewall;
wherein a bottom edge of the flange portion of the rim component forms a ledge that protrudes from the outer surface of the sidewall; and
wherein the flange portion of the rim component comprises an inner surface that faces the outer surface of the sidewall and the outer surface, and wherein a thickness measured between the inner and outer surfaces of the flange portion of the rim component continuously increases moving from the rim portion to the bottom edge of the flange portion.

14. The paper cup according to claim 13 wherein the sidewall is conical so that the outer surface of the sidewall is angled away from the cavity axis, wherein the inner surface of the flange portion of the rim component is angled to lay flush against the outer surface of the sidewall without any gaps, and wherein the outer surface of the flange portion of the rim component is oriented parallel to the cavity axis.

15. A paper cup comprising:
   a sidewall;
   a floor portion;
   a cavity having a cavity axis defined by the sidewall and the floor portion;
   a rim component comprising a rim portion and a flange portion, the flange portion being bonded to a top portion of the sidewall and the rim portion protruding radially outward beyond an outer surface of the flange portion;
   wherein the sidewall, the floor portion, and the rim component are all formed from one or more paper-based materials;
   wherein the rim portion of the rim component comprises an exposed underside surface that faces downwardly in a direction towards the floor portion; and
   wherein the exposed underside surface of the rim portion of the rim component extends from the outer surface of the flange portion to a distal end of the rim portion, and wherein the outer surface of the flange portion is exposed and faces away from the sidewall.

* * * * *